United States Patent [19]

Rado

[11] Patent Number: 4,460,550
[45] Date of Patent: * Jul. 17, 1984

[54] PROCESS FOR PRODUCTION OF TITANIUM DIOXIDE FROM TITANIFERROUS ORE

[75] Inventor: Theodore A. Rado, Oklahoma City, Okla.

[73] Assignee: Kerr-McGee Chemical Corporation, Oklahoma City, Okla.

[*] Notice: The portion of the term of this patent subsequent to Apr. 10, 2001 has been disclaimed.

[21] Appl. No.: 491,216

[22] Filed: May 3, 1983

Related U.S. Application Data

[63] Continuation-in-part of Ser. No. 480,252, Mar. 30, 1983.

[51] Int. Cl.³ ............... C01G 23/02; C01G 23/07
[52] U.S. Cl. ............................ 423/79; 423/76; 423/77; 423/DIG. 12
[58] Field of Search ............. 423/76, 77, 79, DIG. 12

[56] References Cited

U.S. PATENT DOCUMENTS

| | | | |
|---|---|---|---|
| 3,639,100 | 2/1972 | Rick | 423/DIG. 12 |
| 4,024,221 | 5/1977 | Becker et al. | 423/DIG. 12 |
| 4,039,647 | 8/1977 | Wohleber et al. | 423/DIG. 12 |
| 4,083,923 | 4/1978 | Lippman et al. | 423/DIG. 12 |
| 4,179,492 | 12/1979 | Kruesi | 423/DIG. 12 |
| 4,209,501 | 6/1980 | Kruesi | 423/DIG. 12 |

FOREIGN PATENT DOCUMENTS 161492 7/1964 U.S.S.R. .......................... 423/79

Primary Examiner—Herbert T. Carter
Attorney, Agent, or Firm—William G. Addison

[57] ABSTRACT

Titanium tetrachloride is produced from titanium ore and reductant suspended in molten salt by the passage of chlorine therethrough. The titanium tetrachloride is scrubbed by passage through at least one scrubber of molten salt and oxidized to produce titanium oxide and chlorine. Chlorine is recaptured as a solute in cold titanium tetrachloride and then liberated and recycled.

9 Claims, 2 Drawing Figures

PROCESS FOR PRODUCTION OF TITANIUM DIOXIDE FROM TITANIFERROUS ORE

CROSS-REFERENCE TO RELATED APPLICATIONS

The present application is a continuation-in-part of the co-pending application entitled "IMPROVED PROCESS FOR CHLORINATING TITANIUM ORE", U.S. Ser. No. 480,252, filed on Mar. 30, 1983, which is assigned to the assignee of the present invention.

BACKGROUND OF THE INVENTION

Field of the Invention

The invention relates generally to the field of titanium dioxide production and, more particularly, but not by way of limitation, to a process whereby titanium tetrachloride of sufficient purity for production of pigment-quality titanium dioxide is produced from titaniferrous ore in a molten salt system and oxidized to form titanium dioxide.

SUMMARY OF THE INVENTION

A chlorination zone is produced by providing a first quantity of salt, melting at between about 600 degrees centigrade and about 900 degrees centigrade, in a molten form and having a temperature between about 800 degrees centigrade and about 1000 degrees centigrade. Titanium ore and reductant are introduced into the chlorination zone to produce a loaded chlorination zone. Chlorine is passed into the loaded chlorination zone to produce a first precursor stream comprising titanium tetrachloride.

A scrubbing zone is produced by providing a second quantity of the salt in molten form. The first precursor stream is passed into the scrubbing zone to produce a second precursor stream comprising purified titanium chloride. The second precursor stream is passed into a combustion zone wherein the second precursor stream is combusted to form a product mixture comprising titanium dioxide and chlorine. The titanium dioxide then is recovered from the product mixture.

DESCRIPTION OF THE PREFERRED EMBODIMENT

The chlorination of titanium ores to produce titanium tetrachloride has been efficiently accomplished by preparing a fine particulate bed of titanium ore and carbonaceous reductant. This bed then was fluidized by the passage of chlorine therethrough which also chlorinated accessible ore-metals, including titanium. Titanium tetrachloride, accompanied by impurities including other volatile metal chlorides, fine ore and reductant particles, is produced as a typical product stream by the above-type procedure. This product stream must be freed of particles, many of which are wasted, and the titanium tetrachloride condensed, purified, revaporized and reheated before it may be oxidized to form acceptably pure titanium dioxide. The process of the present invention obviates many of the inefficiencies of past procedures as will be apparent to those skilled in the art upon examination of the accompanying description.

Among the more obvious advantages of the present procedure, to be later described more completely, are:
1. virtual elimination of particulate losses due to the passage of gases through the titanium ore and reductant;
2. an increase in the usability of particularly fine particles of ore and reductant, thereby increasing the efficiencies of chemical reactions;
3. a reduction in the number of steps such as purifications, coolings and reheatings; and
4. the efficient utilization of chlorine.

In the prior fluidized bed process, the ore and coke tended to blow out of the chlorinator once the ore and coke reacted down to a relatively small size and this loss represented a significant economic penalty. Very fine ore could not be used in this particular process because it blew out of the chlorinator almost immediately after being passed into the chlorinator. Also, in this particular process, unreactive impurities tended to accumulate in the fluid bed and it was difficult and relatively expensive to remove such impurities from the fluid bed. The titanium ore chlorination process of the present invention is intended to provide a process for overcoming these disadvantages among others and, in the process of the present invention, the chlorination is conducted in a molten salt bath such that the ore and coke are suspended in the molten salt, through which chlorine is bubbled. Thus, in the process of the present invention, fine ore and coke can be used since the ore and coke cannot blow out from the molten salt and virtually a one hundred percent yield can be achieved. Many impurities are trapped by the molten salt, thereby resulting in a more pure titanium tetrachloride leaving the chlorinator to pass through a molten salt scrubber and a titanium tetrachloride suitable for titanium dioxide production leaving the scrubber.

Figure 1:
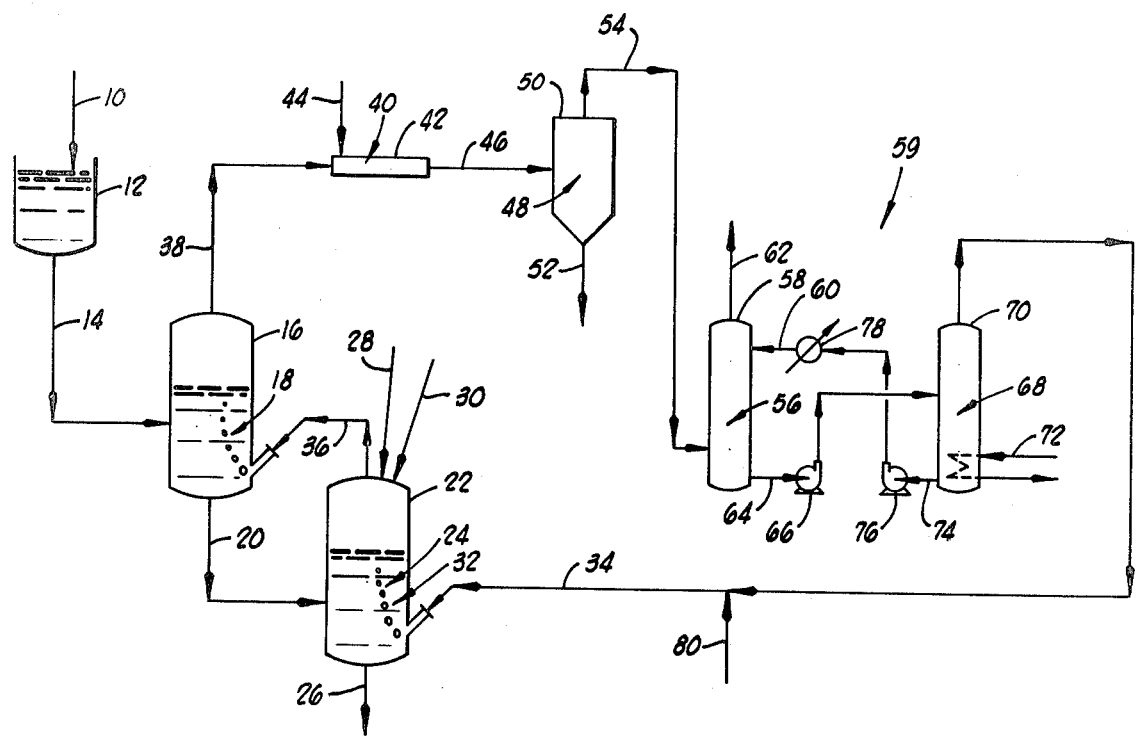
FIG. 1 is a schematic diagram of the flow of materials in one embodiment of the present invention.

With reference to FIG. 1, the salt, melting at between about 600 degrees centigrade and about 900 degrees centigrade, preferably sodium chloride or potassium chloride or a mixture of sodium chloride and potassium chloride, or calcium chloride if the by-product salts are reclaimed for sale, is introduced via a conduit 10 into a melter 12 which is maintained at a temperature sufficient to melt the salt. The salt is reduced to a molten form in the melter 12 and the melter 12 thus provides a source of molten salt.

For purposes of clarity, the flow of molten salt first will be described alone and then in combination with the chlorination process. Molten salt passes from the melter 12 via a conduit 14 to a scrubber 16 where the molten salt forms a scrubbing zone 18 in the scrubber 16. Overflow from the scrubbing zone 18 passes via a conduit 20 to a chlorinator 22 where such overflow forms a chlorination zone 24 in the chlorinator 22, the overflow being passed from the scrubber 16 at a predetermined level in the scrubber 16. Overflow from the chlorination zone 24 passes from the chlorinator 22 via a conduit 26, the overflow being passed from the chlorinator 22 at a predetermined level in the chlorinator 22.

In the chlorination zone 24, a first quantity of salt, preferably comprising sodium chloride (and desirably some portion of another salt so as to reduce the melting point) and melting at between about 600 degrees centigrade and about 900 degrees centigrade, is maintained in a molten form at a temperature between about 800 degrees centigrade and about 1000 degrees centigrade.

Synthetic or natural titanium ore, such as ilmenite, is introduced into the chlorination zone 24 of the chlorinator 22 via a conduit 28. The ore, in one embodiment, is in a finely divided form to facilitate suspension in the molten salt and also to maximize its surface to volume ratio. A carbonaceous reductant, preferably coke, is introduced into the chlorination zone 24 of the chlorinator 22 via a conduit 30 to form a loaded chlorination zone 32. The reductant, also in one embodiment, is in a finely divided form. The ore and reductant also may be premixed and added to the chlorinator 22 via a single conduit, if desired in a particular application. In either event, an ore to reductant ratio of between about 6 to 10 and about 6.5 to 7.0 preferably is maintained in the chlorinator 22.

The ore and reductant are suspended in the molten salt of the chlorination zone 24 which is maintained at the temperatures mentioned before. The molten salt content of the loaded chlorination zone 32 is maintained about 80 weight percent to about 90 weight percent.

Chlorine gas then is passed via a conduit 34 into the loaded chlorination zone 32. The chlorine gas preferably bubbles through the loaded chlorination zone 32 in small bubbles such as emitted from a sparger.

A first precursor stream, comprising titanium tetrachloride, chlorination by-products, carbon monoxide and carbon dioxide is produced by chlorination and is transferred via a conduit 36 to the scrubber 16. The scrubber 16 contains a second quantity of molten salt to form the scrubbing zone 18. The second quantity of salt is molten and has substantially the same characteristics as the first quantity of salt maintained in molten form in the chlorination zone 24.

The first precursor stream preferably is bubbled and, preferably as small bubbles from a sparger, through the scrubbing zone 18 and certain chlorination by-products, such as iron chlorides are absorbed by the molten salt to produce a second precursor stream comprising purified titanium tetrachloride, carbon monoxide and carbon dioxide which passes from the scrubber 16 via a conduit 38. The second precursor stream may be further processed or used as a final precursor for titanium dioxide formation as is later described.

While the chlorination and scrubbing are being carried out as described, the flow of molten salt simultaneously is proceeding as described before from the melter 12 to the scrubber 16 and then to the chlorinator 22. During the scrubbing of the first product stream in the scrubbing zone 18 in the scrubber 16, some chlorination by-products are absorbed, possibly as non-volatile double salts, and passed to the chlorination zone 24 of the chlorinator 22 with the scrubbing zone 18 overflow. In the loaded chlorination zone 32, similar chlorination by-products are produced and some are absorbed in the molten salt to pass with the chlorination zone 24 overflow for disposal as waste or for further processing. Also passing with the chlorination zone 24 overflow are extracted particles of titanium ore and particles from oxidized reductant.

Figure 2:
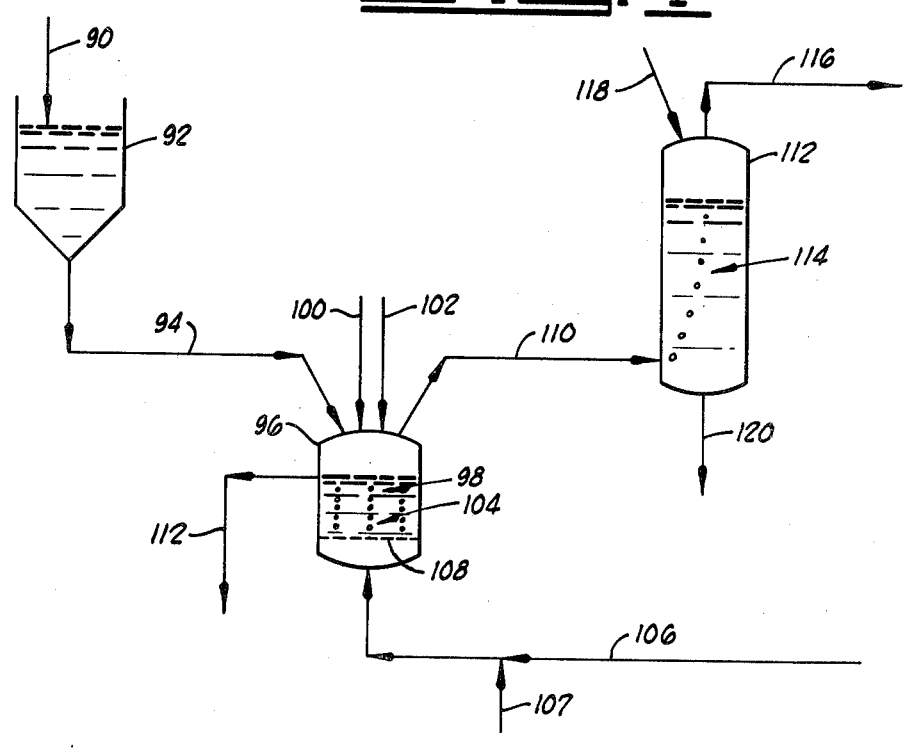
FIG. 2 is a schematic diagram of the flow of materials in another embodiment of the present invention.

The salt preferably used throughout the processes shown in FIGS. 1 and 2 essentially is sodium chloride, potassium chloride, calcium chloride or mixtures thereof. These particular salts are preferred because of their ability to form non-volatile double salts with certain non-titanium volatile metallic chlorides. Other salts having this capacity or even lacking this capacity would also be used in the processes of this invention, if they have appropriate melting and boiling points.

The preferred embodiments of the above discussed portion of the present invention offer numerous advantages over prior titanium ore chlorination methods. One particular advantage is the efficient usage of fine ore and reductant particles. Such fine particles are retained in molten salt suspension and not readily lost with the passage of gases therethrough. Fine particles characteristically have a high surface to volume ratio, permitting more complete interactions and contact with chlorine. These qualities permit a high yield of titanium tetrachloride to be obtained.

A further particular advantage, mentioned earlier, is the formation of non-volatile double salts from, for example, the volatile ore chlorination by-product ferrous chloride and sodium chloride. Such double salt formation permits production of a gaseous titanium tetrachloride in a more pure form than has been accomplished for the most part with other methods. This particular advantage also leads to a more ready removal of by-products from the chlorination zone. Additionally, dissolution of by-products in molten salts leads to similar advantages.

The temperatures utilized in the chlorination and scrubbing zones produced a heated precursor stream directly useful for certain subsequent heat-requiring processes, one of which is subsequently described.

The second precursor stream comprising titanium tetrachloride, carbon monoxide and carbon dioxide passes through the conduit 38 and to a combustion zone 40 of an oxidizer 42. Oxygen, preheated to a temperature suitable for titanium dioxide production, is passed via a conduit 44 into the combustion zone 40 of the oxidizer 42. The oxygen is passed into the combustion zone 40 in quantities greater than equimolar with the titanium chloride being passed into the combustion zone 40 to provide sufficient oxygen to oxidize carbon monoxide entering with the second precursor stream. The temperature of the oxygen entering the combustion zone 40 will vary, depending upon the temperature of the second precursor stream and the design of the oxidizer 42. The mixture of the second precursor stream and oxygen should approach about 982 degrees centigrade for efficient combustion to form pigment-quality titanium dioxide in a conventional oxidizer 42, such as that described in U.S. Pat. No. 3,512,219, issued to Stern, said patent specification being specifically incorporated herein by reference.

The oxygen and second precursor stream are reacted in the combustion zone 40 of the oxidizer 42 to form a product mixture comprising titanium dioxide and chlorine. The product mixture is passed from the combustion zone 40 via a conduit 46 to a separation zone 48 of a separator 50. This separator 50 may be of any of the types well-known in the art, such as a cyclonic type separator, for example, In the separation zone 48, particulate matter, particularly titanium dioxide containing minor amounts of other metal oxides, is separated from gases such as chlorine and carbon dioxide.

Titanium dioxide is recovered from the separation zone 48 via a conduit 52 for use or further processing. Gases comprising chlorine and carbon dioxide are withdrawn from the separation zone 48 via a conduit 54 and transferred to the absorption zone 56 of a chlorine separator 58 which is part of a chlorine recovery unit generally designated by the reference numeral 59. Titanium tetrachloride, cooled to between about −10 degrees centigrade and about −5 degrees centigrade, also is transferred via a conduit 60 into the absorption zone 56.

In the absorption zone 56, the temperature is maintained at between about −5 degrees centigrade and about 0 degrees centigrade and the contact of liquid titanium tetrachloride with gas from the separator 50 is accomplished by conventional means such as vigorous agitation or spraying. Chlorine, but not carbon dioxide, substantially is absorbed or dissolved in the titanium tetrachloride, producing chlorine-loaded titanium tetrachloride liquid and a gas, primarily comprising carbon dioxide.

The gas is removed from the absorption zone 56 via a conduit 62 and the chlorine-loaded titanium tetrachloride is passed via a conduit 64 and a pump 66 to the pressurized stripping zone 68 of a stripper 70. The pressurized stripping zone 68 is maintained at about a pressure of between about 20 to about 40 psig and at a temperature of between about 120 degrees centigrade and about 140 degrees centigrade. This temperature may be maintained by the passage of steam through a heating conduit 72 or by any other conventional means. The increased temperature lowers the solubility of chlorine and results in the production of gas comprising chlorine and titanium tetrachloride liquid substantially freed of dissolved chlorine.

The titanium tetrachloride is returned to the absorption zone 56 via a conduit 74, a pump 76 and cooling chamber 78. The chlorine is recycled to the chlorination zone 24 via the conduit 34 and may be supplemented by makeup chlorine supplied via a conduit 80.

Embodiment of FIG. 2

Referring to FIG. 2, a second embodiment of the present invention is illustrated. Salt, as that used in the first embodiment of the present invention, is introduced via a conduit 90 into a melter 92 which is maintained at a temperature sufficient to melt the salt. The salt is reduced to a molten form in the melter 92 and the melter 92 thus provides a source of molten salt.

Molten salt melting between about 600 degrees centigrade and about 900 degrees centigrade, and preferably comprising sodium chloride (and desirably some portion of another salt so as to reduce the melting point) is passed via a conduit 94 from the melter 92 to a chlorinator 96 where it is maintained in molten form at a temperature between about 800 degrees centigrade and about 1000 degrees centigrade to form a chlorination zone 98.

Synthetic or natural titanium ore, such as ilmenite, is intorduced into the chlorination zone 98 via a conduit 100. The ore in one embodiment is in a finely divided form to facilitate suspension in the molten salt and also to maximize its surface to volume ratio. A carbonaceous reductant, preferably coke, is introduced into the chlorination zone 98 of the chlorinator 96 via a conduit 102 to form a loaded chlorination zone 104. The reductant, also in one embodiment, is in a finely divided form. The ore and reductant may also be premixed and added to the chlorinator 96 via a single conduit, if desired in a particular application. In either event an ore to reductant ratio of between about 6 to 10 and about 6.5 to 7.0 preferably is maintained in the loaded chlorination zone 104.

The ore and reductant are suspended in the molten salt of the chlorination zone 98 and the resultant loaded chlorination zone 104 is maintained at the temperatures mentioned before. The molten salt content of the loaded chlorination zone 104 is maintained at about 80 weight percent to about 90 weight percent.

Chlorine gas then is passed via a conduit 106 into the loaded chlorination zone 104. The chlorine gas preferably bubbles through the loaded chlorination zone in small bubbles such as those passed by the sparging structure 108 which substantially is permeable to chlorine gas but not to molten salt. Makeup chlorine gas may be added by passing makeup chlorine gas through a conduit 107 into the conduit 106.

A first precursor stream comprising titanium tetrachloride chlorination by-products, carbon monoxide and carbon dioxide is produced by chlorination and is transferred via a conduit 110 to a scrubber 112. As the first precursor stream is being produced in the chlorinated loaded chlorination zone 104 additional quantities of ore and reductant may be continually added as replenishment to maintain the above described contents of the loaded chlorination zone 104. Molten salt from the melter 92 also may be continually added during chlorination to maintain the above described salt content and to produce the loaded chlorination zone 104 overfow. This overflow passes from the loaded chlorination zone 104 via a conduit 112 when the contents of the loaded chlorination zone 104 reach a predetermined level. This overflow comprises molten salt, particles of extracted ore, particles from oxidized reductant and complexes such as double salts of molten salt with certain chlorination by-products as discussed earlier herein.

The scrubber 112 contains molten salt maintained at temperatures between about 500 degrees centigrade and about 800 degrees centigrade to form a scrubbing zone 114. The first precursor stream passing via a conduit 110 from the chlorinator 96 passes into the scrubbing zone 114, preferably as small bubbles emitted from a sparger.

While bubbling through the scrubbing zone 114, chlorination by-products such as ferrous chloride form double salts with molten species of salt to produce a second precursor stream comprising purified titanium tetrachloride, carbon monoxide and carbon dioxide. The second precursor stream passes from the scrubber 112 via a conduit 116 for passage to an oxidizer as shown in FIG. 1 (numeral 42).

While the scrubbing process is proceeding in the scrubber 112, additional salt may be added via a conduit 118 to freshen the molten salt of the scrubbing zone 114 and to produce an outflow of molten salt containing ferrous chloride which passes from the scrubber 112 via a conduit 120 for disposal or further processing.

The production of titanium dioxide and recovery of chlorine in his embodiment are as discussed in the embodiment illustrated in FIG. 1 and will not be repeated further at this point.

It is understood that many other arrangements of chlorination and scrubbing are possible, some of which may be preferred for particular applications of the present invention. For example, it is known that, while a particularly heated scrubbing zone (24 or 114) would be advantageous in producing a precursor stream comprising purified titanium tetrachloride heated to temperatures approaching those ideal for titanium dioxide formation, the absorption by molten salt of ferrous chloride chlorination impurities as substantially non-volatile double salts generally is less efficient as the temperatures of molten salt increase.

Thus, the advantages of a series of at least two molten salt scrubbers may be seen, the first at a relatively low temperature maximally to absorb ferrous chloride impurities and a second at a relatively high temperature to optimize the subsequent production of titanium oxide.

Changes may be made in the construction, operation and arrangement of the various parts and elements described herein or in the steps or in the sequence of steps described herein without departing from the concept and scope of the invention as defined in the following claims.

What is claimed is:

1. A method for producing titanium dioxide from natural or synthetic titanium ore, carbonaceous reductant and chlorine and oxygen comprising the steps of:
   providing a first quantity of salt, melting at between about 600 degrees centigrade and about 900 degrees centigrade, in molten form having a temperature between about 800 degrees centigrade and about 1000 degrees centigrade to produce a chlorination zone;
   introducing the titanium ore and the reductant into the chlorination zone to produce a loaded chlorination zone;
   passing chlorine into the loaded chlorination zone to produce a first precursor stream comprising titanium tetrachloride wherein the molten salt cooperates to retain relatively fine particles of titanium ore and reductant so such relatively fine particles do not enter into the first product precursor stream, thereby permitting smaller sizes of titanium ore and reductant particles to be utilized, and further wherein chloride salt impurities are formed, at least some of which form substantially nonvolatile double salts with the molten salt to reduce impurities in the first puecursor stream;
   providing a second quantity of salt in molten form to produce a scrubbing zone;
   passing the first precursor stream from the loaded chlorination zone into the scrubbing zone, wherein the first precursor stream is defined further as comprising formed chloride salt impurities and the molten salt of the scrubbing zone is defined further as cooperating to form substantially nonvolatile double salts with at least some of said formed chloride salt impurities to procude a second precursor stream comprising purified titanium tetrachloride;
   providing a stream of oxygen preheated to about 1000 degrees centigrade;
   passing the second precursor stream from the scrubbing zone and the stream of oxygen to a combustion zone to produce a combustible mixture;
   combusting the combustible mixture in the combustion zone to form a product mixture comprising titanium dioxide, carbon dioxide and chlorine; and
   recovering the titanium dioxide from the product mixture.

2. The method of claim 1 wherein the steps of providing the first and second quantity of salt are defined further to include the steps of:
   providing a source of molten salt;
   passing the molten salt from the source into the scrubbing zone; and
   passing the molten salt from the scrubbing zone into the chlorination zone.

3. The process of claim 1 wherein the salt is defined further as comprising one of sodium chloride, potassium chloride and a mixture of sodium chloride and potassium chloride, or calcium chloride if the by-product salts are reclaimed for sale.

4. The process of claim 1 wherein the carbonaceous reductant is defined further as being coke.

5. The process of claim 1 wherein the titanium ore is defined further as being ilmenite.

6. The method of claim 1 defined further to include the step of:
   passing the molten salt, titanium ore and reductant from the loaded chlorination zone at a predetermined level for producing a loaded chlorination zone overflow comprising chlorination by-products.

7. The method of claim 1 wherein the step of providing the first quantity of salt is defined further to include the steps of:
   providing a source of salt in molten form;
   passing the salt in molten form from the source to produce the second quantity of salt in molten form comprising the scrubbing zone; and
   passing salt in molten form from the scrubbing zone to produce the first quantity of salt comprising the chlorination zone.

8. The method of claim 7 defined further to include, after and during the passing chlorine step, passing molten salt, titanium ore and reductant from the chlorination zone at a predetermined rate to produce a loaded chlorination zone overflow comprising chlorination by-products, residues and impurities.

9. A method for producing titanium dioxide from natural or synthetic titanium ore, carbonaceous reductant, chlorine and oxygen, comprising the steps of:
   providing a first quantity of salt, melting at between about 600 degrees centigrade and about 800 degrees centigrade, in molten form having a temperature between about 800 degrees centigrade and about 1000 degrees centigrade to produce a chlorination zone;
   introducing the titanium ore and the reductant into the chlorination zone to produce a loaded chlorination zone;
   passing chlorine into the loaded chlorination zone to produce a first precursor stream comprising titanium tetrachloride;
   providing a second quantity of salt in molten form to produce a scrubbing zone;
   passing the first precursor stream from the loaded chlorination zone into the scrubbing zone to produce a second precursor stream comprising pruified titanium tetrachloride;
   providing a stream of oxygen preheated to about 1000 degrees centigrade;
   passing the second precursor stream from the scrubbing zone and the stream of oxygen to a combustion zone to produce a combustible mixture;
   combusting the combustible mixture in the combustion zone to form a product mixture comprising titanium dioxide, carbon dioxide and chlorine;
   recovering titanium dioxide from the product mixture;
   providing an absorption zone comprising cold titanium tetrachloride;
   passing the carbon dioxide and chlorine remaining in the produce mixture after recovery of titanium dioxide therefrom to the absorption zone from the combustion zone;
   contacting the carbon dioxide and chlorine with the cold titanium tetrachloride in the absorption zone to produce a liquid comprising cold titanium tetrachloride and chlorine and a gas comprising carbon dioxide;

passing the liquid from the absorption zone to a stripping zone;

treating the liquid in the stripping zone to produce a gas comprising chlorine and a liquid comprising titanium tetrachloride;

recovering the gas comprising chlorine from the stripping zone and recycling said gas to the chlorination zone; and cooling the liquid comprising titanium tetrachloride from the stripping zone and recycling the cooled liquid to the absorption zone.

* * * * *